(12) United States Patent  
Algreatly

(10) Patent No.: US 9,298,008 B2  
(45) Date of Patent: Mar. 29, 2016

(54) 3D IMMERSION TECHNOLOGY

(71) Applicant: Cherif Atia Algreatly, Newark, CA (US)

(72) Inventor: Cherif Atia Algreatly, Newark, CA (US)

(73) Assignee: Cherif Atia Algreatly, Fremont, CA (US)

( * ) Notice: Subject to any disclaimer, the term of this patent is extended or adjusted under 35 U.S.C. 154(b) by 347 days.

(21) Appl. No.: 14/098,544

(22) Filed: Dec. 6, 2013

(65) Prior Publication Data

US 2015/0161799 A1    Jun. 11, 2015

Related U.S. Application Data

(60) Provisional application No. 61/797,492, filed on Dec. 6, 2012.

(51) Int. Cl.
| | |
|---|---|
| *G02B 27/01* | (2006.01) |
| *G06F 3/01* | (2006.01) |
| *H04N 13/02* | (2006.01) |
| *G02B 27/22* | (2006.01) |
| *H04N 13/04* | (2006.01) |
| *G02B 27/00* | (2006.01) |

(52) U.S. Cl.
CPC .......... *G02B 27/017* (2013.01); *G02B 27/0093* (2013.01); *G02B 27/2221* (2013.01); *G06F 3/011* (2013.01); *G06F 3/012* (2013.01); *H04N 13/0207* (2013.01); *H04N 13/0278* (2013.01); *H04N 13/0447* (2013.01); *H04N 13/0479* (2013.01)

(58) Field of Classification Search
CPC ...................... G02B 27/017; G02B 2027/0138; G02B 27/01; G06T 19/006; H04N 13/044
See application file for complete search history.

(56) References Cited

U.S. PATENT DOCUMENTS

| | | | | |
|---|---|---|---|---|
| 6,151,060 | A * | 11/2000 | Tabata | H04N 13/0497 345/8 |
| 6,169,549 | B1 * | 1/2001 | Burr | G06T 9/001 345/419 |
| 9,116,666 | B2 * | 8/2015 | Salter | G06F 1/163 |
| 2012/0041971 | A1 * | 2/2012 | Kim | G06F 17/30247 707/769 |
| 2013/0234914 | A1 * | 9/2013 | Fujimaki | G06F 3/011 345/8 |
| 2013/0335543 | A1 * | 12/2013 | Hilkes | H04N 7/185 348/62 |
| 2014/0063060 | A1 * | 3/2014 | Maciocci | G06F 3/011 345/633 |

* cited by examiner

*Primary Examiner* — Jeffrey Chow

(57) ABSTRACT

A method and device is disclosed for converting a picture or a video located in front of a user into an immersive picture or video in real time. The picture can be a picture located in a book or newspaper. The video can be a movie presented on a computer display, TV screen or a theatre screen. The method and the device are also utilized for virtual reality applications presented on a computer display to convert the virtual reality into. The invention can be utilized in various educational, training, entertainment, and gaming applications.

17 Claims, 10 Drawing Sheets

3D IMMERSION TECHNOLOGY

CROSS-REFERENCE TO RELATED APPLICATION

This application claims the benefits of a U.S. Provisional Patent Applications No. 61/797,492, filed Dec. 6, 2012, titled "Method and Device for Converting Pictures into Immersion".

BACKGROUND

The two major commercial available 3D immersion technologies are the cave automatic virtual environment (CAVE) and the head mounted display (HMD). The CAVE is an immersive virtual reality environment where projectors are directed to a plurality of walls and a floor of a room-sized cube. The walls of a CAVE are typically made up of rear-projection screens or flat panel displays, while the floor can be a downward-projection screen, a bottom projected screen or a flat panel display. The user wears 3D glasses inside the CAVE to see 3D graphics generated by the CAVE. The HMD is a display device worn on the user's head or as part of a helmet where the HMD screen covers the sight zone in front of the user's eyes displaying a 3D virtual environment.

The image projected on the CAVE or presented on the HMD gives the user the feeling of being inside and a part of the environment located in the image. Generally, to achieve this perceptually convincing feeling the images or videos are needed to be previously processed or prepared before projecting or presenting them on the CAVE or the HMD. This processing or preparation cannot be done in real time where it requires a long period of time and complex procedures to be done. In fact, until now there has not been a universal technology that enables converting pictures or video to immersion in real time. Once this technology is invented the 3D immersion applications will be dramatically spread to serve various innovative educational, training, gaming, and entertainment applications.

SUMMARY

In one embodiment, the present invention converts a picture presented on computer display or located in a printed book into a 3D immersive picture where the user is perceptually convinced that s/he is located inside the picture and surrounded by the objects that appeared in the picture. In another embodiment, the present invention converts a video or a movie presented on a computer display, a TV screen, or a cinema screen into a 3D immersive video or movie where the user is perceptually convinced that s/he is located inside the 3D environment of the video or the movie. In further embodiments, the present invention converts a real scene located away from the user so that the user is perceptually convinced that s/he is located inside this real scene.

The immersion conversion of the present invention for the pictures, videos, and the real scenes is automatically achieved in real time. There is no time delay between seeing the original pictures, videos, or real scenes and viewing the immersive pictures, videos, or real scenes. Accordingly, the present invention is perfect for use while watching videos or movies on a computer display, TV, or a cinema screen. It is also perfect to use while looking at printed pictures in books, magazines, or newspaper. In real scenes, such as a sport game, the present invention provides excellent user immersion, as if the user is inside game with the game players.

DETAILED DESCRIPTION

In one embodiment, the present invention discloses a method for extracting an image of a spot located in a scene and presenting the image on a plurality of displays that entirely covers a user's sight, wherein the image covers the entire areas of the plurality of displays and the method comprising of four steps. The first step is receiving a signal indicating a request for capturing the scene picture. The second step is extracting the image of the spot of the scene picture. The third step is dividing the image into a number of zones equal to the number of the displays wherein each zone is defined by the projection of the boundary lines of one of the displays onto the image relative to the user's point of view. The fourth step is presenting each zone of the image on a corresponding display wherein the zone of the image is reformed to fit inside the boundary lines of the corresponding display.

Figure 1:
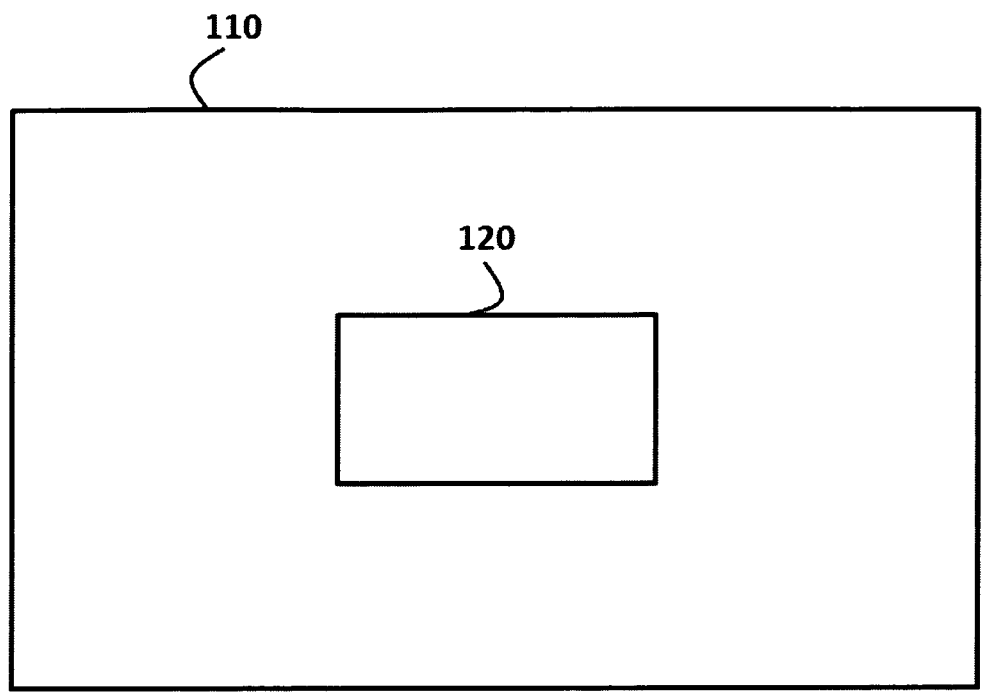
FIG. 1 illustrates a picture located in a printed book or presented on a computer display in front of a user.
Figure 2:
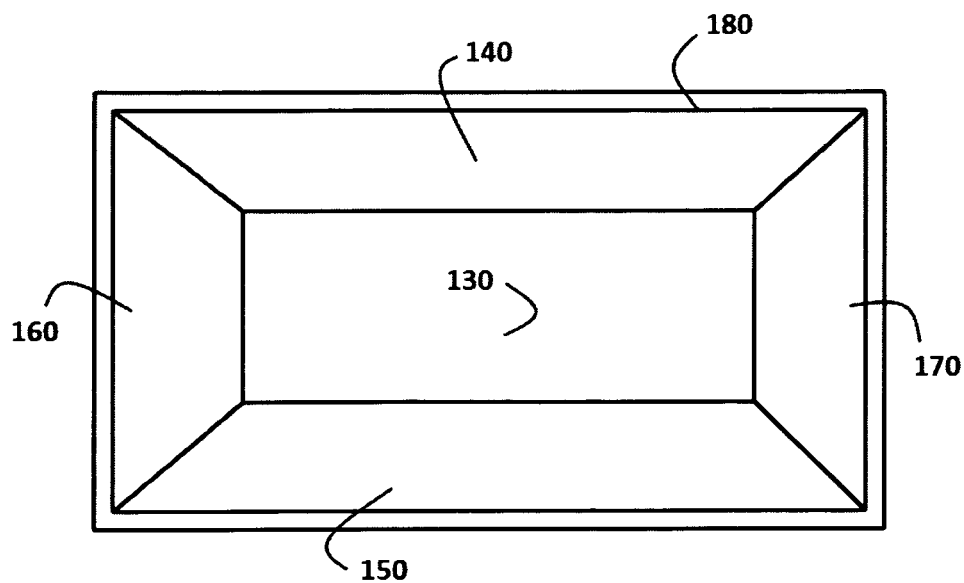
FIG. 2 illustrates a device comprised of five displays attached to each other to create a 3D container that has an opening on one side.

For example, FIG. 1 illustrates a scene 110 located in front of a user where the small rectangle 120 located at the center of the scene represents a spot. The spot can be a picture located in a printed book, a picture presented on a computer screen, or a part of the scene that contains buildings, cars, or people. FIG. 2 illustrates a device comprised of five displays 130-170 attached to each other to form a 3D container that has an opening 180 from one side where the opening can be placed around a user's eyes to be able to simultaneously watch the content of the five displays.

After capturing the scene picture, the spot's image is extracted from the picture. This is achieved by utilizing a computer vision technique, as known in the art, to define the frame of the picture if the spot represents a picture in a printed book or a picture on a computer display. If the spot represents a part of a scene that includes buildings, cars, or people, a selection tool is utilized to enable the user to determine the boundary lines of this spot, as will be described subsequently. Generally, the spot is always located in the center of the scene when the user is looking at the scene.

Figure 3:
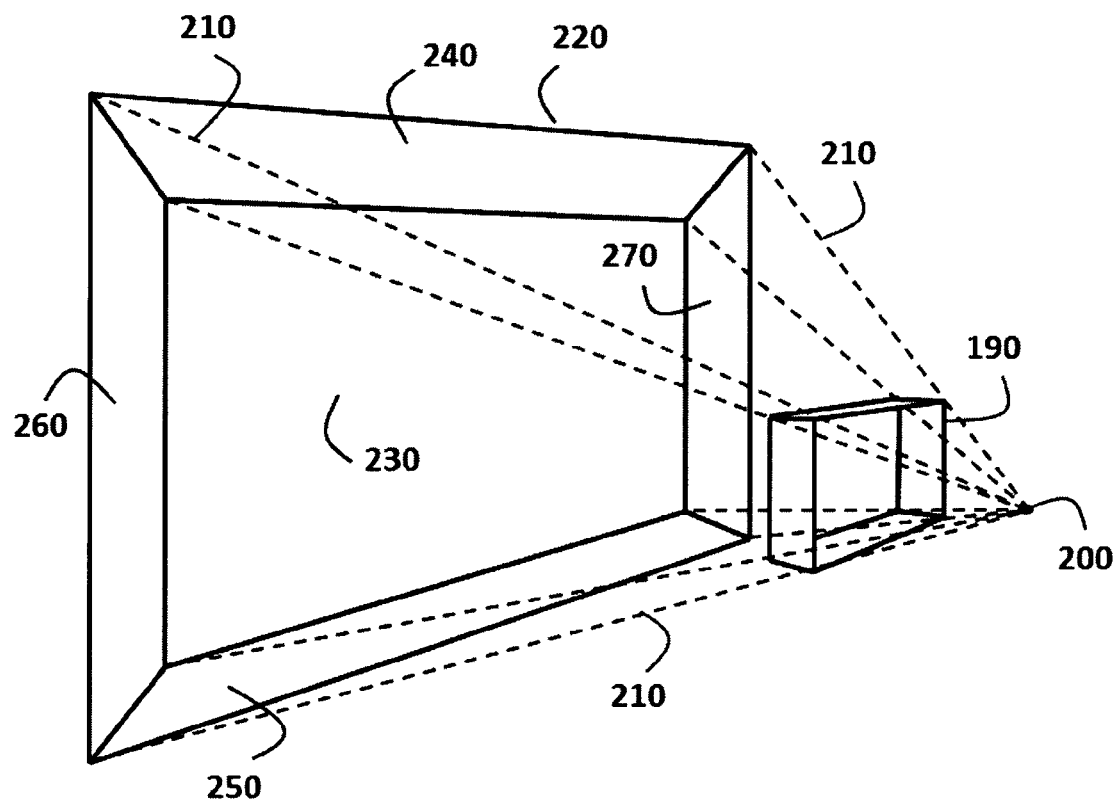
FIG. 3 illustrates the mathematical process of dividing an image into a number of zones corresponding to the number of displays.

FIG. 3 illustrates the mathematical process of dividing the image into zones. As shown in the figure, the device of the five displays 190 is theoretically positioned in front of a point of view 200 representing the user's eyes, where a number of rays 210 are extending from the point of view to the corners of the five displays to intersect with the spot image 220. The intersection between the rays and the spot image divides the spot image into five zones 230-270 corresponding to the five displays. Generally, to ensure that all rays will intersect with the spot image, it is essential to increase the size of the spot image relative to the device as shown in the figure.

Figure 4:
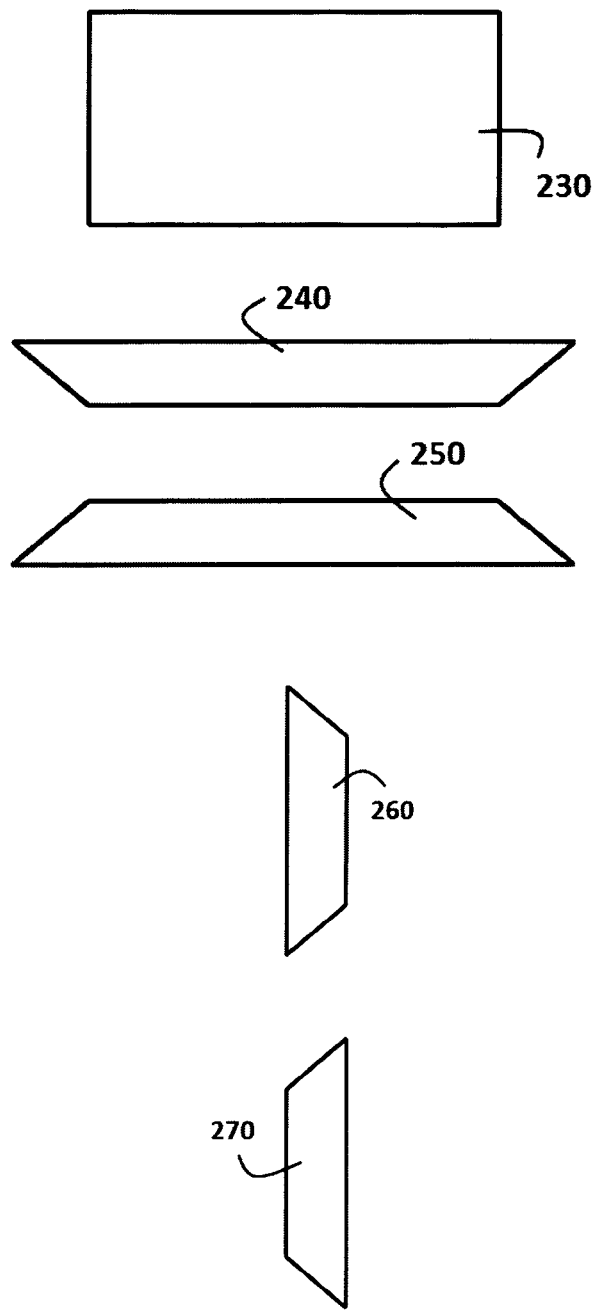
FIG. 4 illustrates the shapes of five zones of an image separated from each other.
Figure 5:
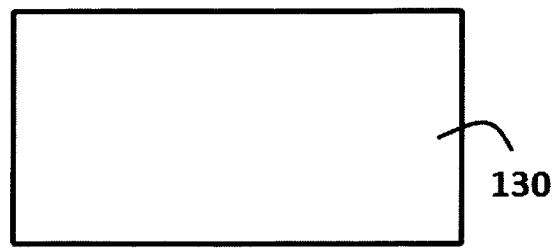
FIG. 5 illustrates the shapes of five displays of a device separated from each other.
Figure 5:
Figure 5:
Figure 5:
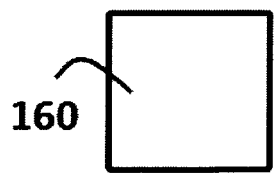
Figure 5:
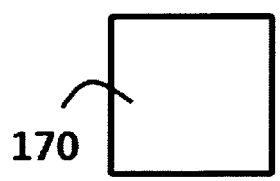

At this moment each one of the five zones is reformed to be presented on a corresponding display of the five displays. FIG. 4 illustrates the five zones 230-270 of the spot image while FIG. 5 illustrates the five displays 130-170 of the device. Accordingly, the first zone 230 will be reformed to fit inside the first display 130, the second zone 240 will be reformed to fit inside the second display 140, the third zone 250 will be reformed to fit inside the third display 150, the fourth zone 260 will be reformed to fit inside the fourth display 160, and the fifth zone 270 will be reformed to fit inside display 170.

Presenting the five zones on the five displays gives the user the feeling of being inside or a part of the environment locates in the image of the spot. In this case, the scene in front of the user will disappear and only the spot of the scene will be viewed to the user on the five displays. If the spot image contains a building or a car, the user will feel that s/he is standing right in front this building or car. If the spot image contains a group of people, the user will feel that s/he is standing right in front of those people.

Figure 6:
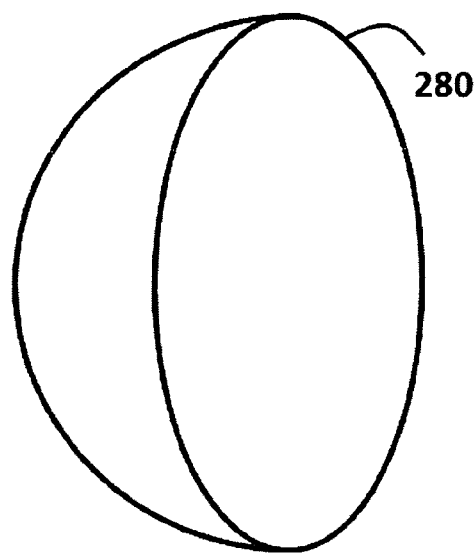
FIGS. 6-10 illustrate different devices that have different shapes of displays attached to each other.
Figure 7:
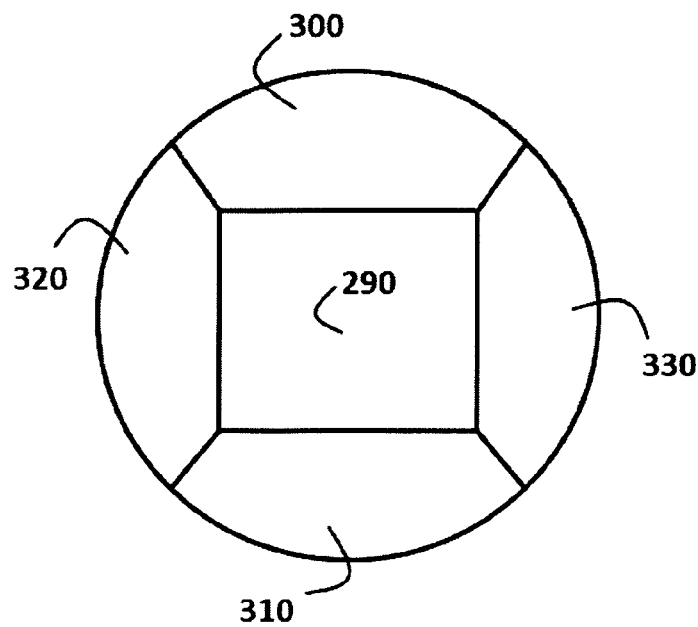
Figure 8:
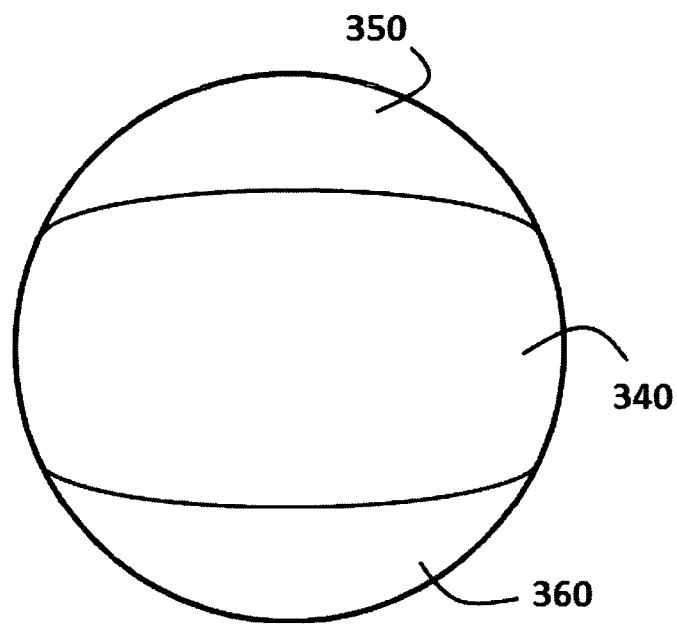
Figure 9:
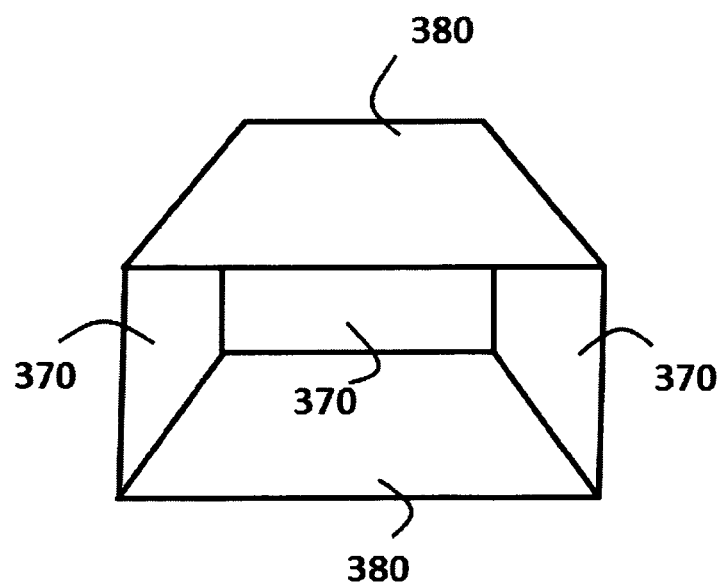
Figure 10:
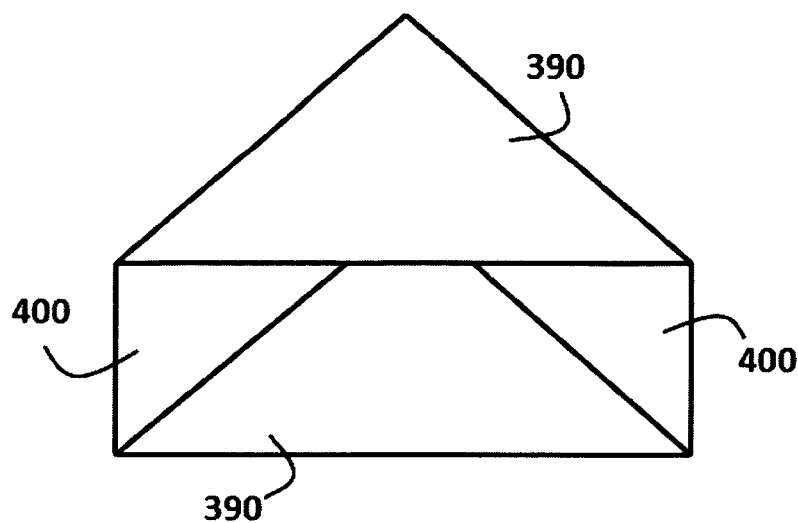

Each one of the five displays is in the form of a rectangular screen. However, the number and shapes of the displays can differ from rectangular displays. For example, FIG. 6 illustrates a device 280 in the form of a semi-sphere wherein the device is comprised of five displays 290-330 as illustrates in FIG. 7. FIG. 8 illustrates the same semi-sphere device comprised of three displays 340-360 instead of the five displays. FIG. 9 illustrates a device comprised of three displays 370 in the form of a rectangle and two other displays in the form of a trapezoid. FIG. 10 illustrates another device comprised of two displays 390 in the form of a triangle and another two displays in the form of a rectangle.

Generally, to make the zones of the spot image presented on the different screens of different devices, the process illustrated in FIG. 3 will be utilized for each different device. Accordingly, the same spot image will have different numbers and shapes of zones according to the number and shape of the device displays. Also, each zone will be reformed according to the shape of the corresponding display of the device to fit inside this corresponding display. Generally, dividing the spot image into zones can be described as a projection of the boundary lines of each one of the displays onto the spot image relative to the user's point of view. Accordingly, each projection of boundary lines of a display determines the boundary lines of a zone.

Figure 11:
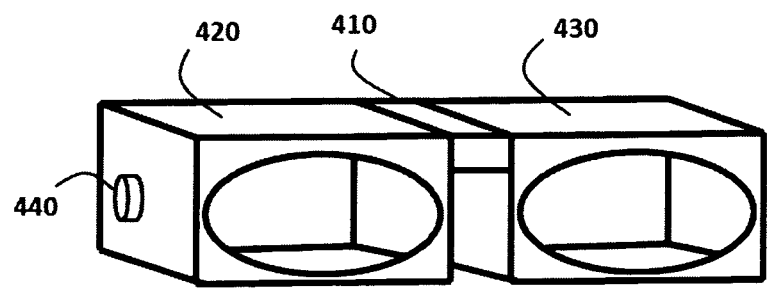
FIG. 11 illustrates another form of a device comprised of a first part assigned to the left eye, and a second part assigned to the right eye of a user.

FIG. 11 illustrates another form of a device 410 comprised of two parts. The first part 420 is assigned to the left eye and comprised of five rectangular displays. The second part 430 is assigned to the right eye and comprised of another five rectangular displays. The button 440 located on the side of the device is to be touched by a user to provide a signal representing a request for starting the process of projecting the zones of the spot image on the displays. As described previously if a picture is displayed in front of the user, the present invention utilizes a computer vision technique to determine the frame of the picture and extract this frame with its content.

if the user needed to select a part of the scene located in front of him/her, then the user is required to determine this part of the scene. This is can be achieved by a button on the device where keeping the button in contact with a user's finger makes a rectangle appear on the displays where the size of the rectangle is associated with the time period of touching the button. Accordingly, the user can control the size of the rectangle or the frame that determines the part of the scene to be selected. The one button can be more than one button to enable changing the height and width of the rectangle to frame different objects of the scenes that have different relative dimensions such as buildings, cars, people, or the like.

Figure 12:
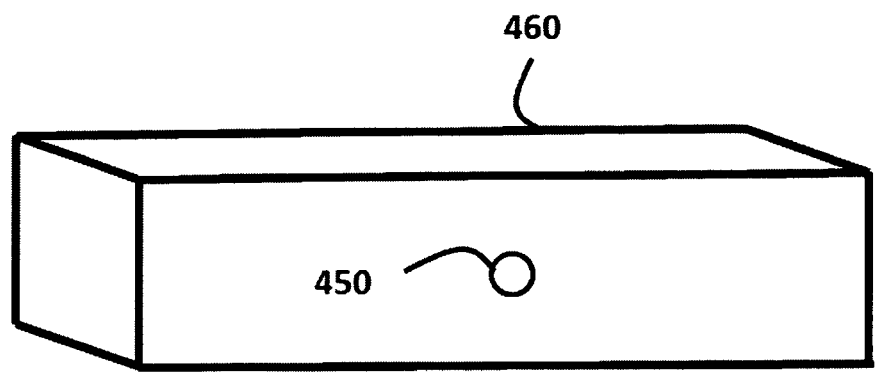
FIG. 12 illustrates a camera positioned at the center of the front side of a device to be aligned with the user's eyes.

The idea of presenting a picture on a plurality of displays that completely covers a user's sight can also be used for videos or movies. In this case, while a user is watching a video on a computer display or watching a movie on a screen of a TV or a theatre then the frame of the video or movie is divided into zones and presented on the displays of the device. However, in all such cases of dealing with pictures, videos, or movies, a camera is utilized with the device to capture the picture, videos, or moves in real time. The camera can be attached to the center of the front surface of the device to be aligned with the middle of the left and right eyes of the user. For example, FIG. 12 illustrates a camera 450 positioned at the center of the front side of a device 460 to be aligned between the two eyes of the user.

Accordingly, in another embodiment, the present invention discloses a device for extracting an image of a spot located in a scene and presenting the image on a plurality of displays that entirely cover a user's sight, wherein the image covers the entire areas of the plurality of displays and the device is comprised of four components. The first component is a plurality of displays attached to each other to form a 3D container with an opening that enables simultaneous viewing to the plurality of displays. The second component is a camera that captures the picture of the scene with the spot. The third component is a button that can be pressed to generate a signal representing a request for converting the image into immersive image. The fourth component is a microprocessor that extracts the image of the sport from the picture of the scene; divides the image into zones corresponding to the plurality of displays reforms each zone of the image to fit inside a corresponding display of the plurality of displays; and presents the image of each zone after the reforming to the corresponding display.

As described previously, the spot of the scene may include a picture, a video, or a movie. In another embodiment, the spot includes a 3D virtual reality presented on a computer screen. In this case, the user of the device can sit at any place away from the computer while using the device to look at a scene that includes the computer display. To walk through the 3 D environment of the virtual reality presented on the computer display, there is a need for detecting the rotation of the user head and also detecting the user's movement relative to the computer display.

Figure 13:
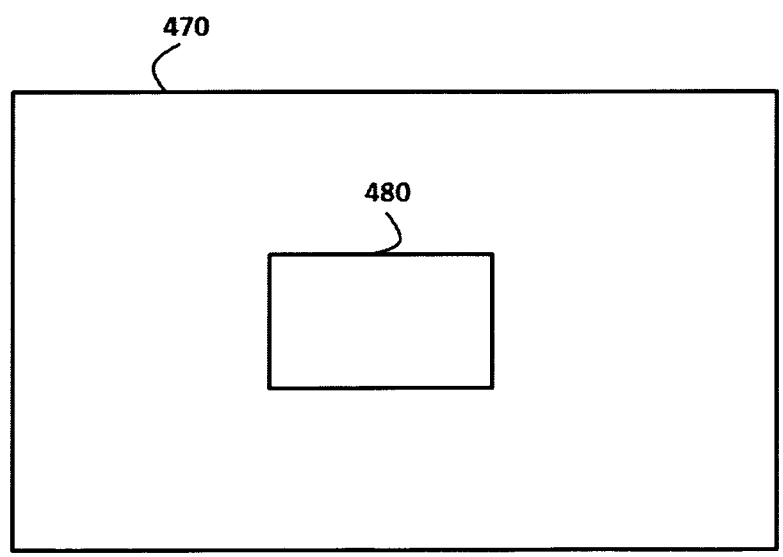
FIGS. 13 to 15 illustrate changing the position of the spot frame in the scene picture when the user's rotated his/her head
Figure 14:
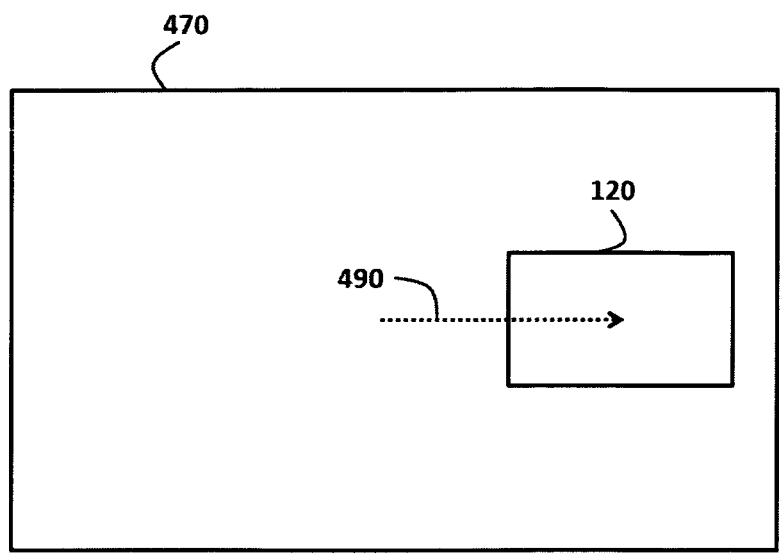
Figure 15:
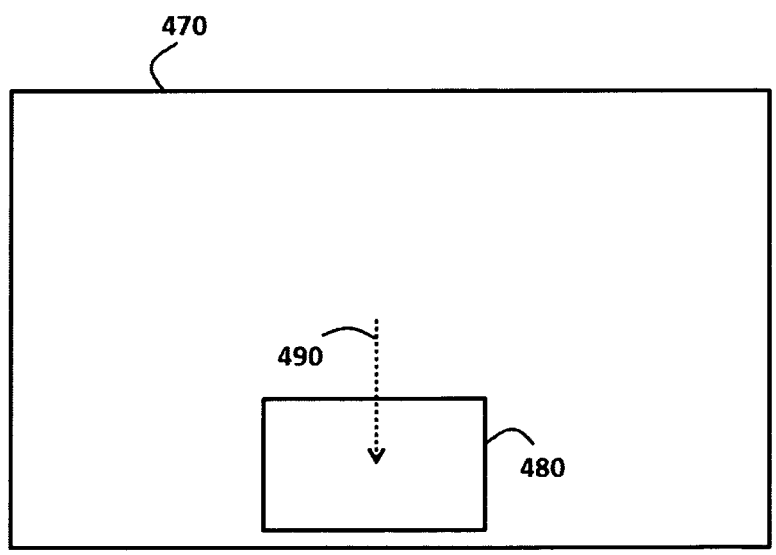

Detecting the rotation of the user's head can be achieved by analyzing the change of the location of the spot frame in the picture of the scene. For example, FIG. 13 illustrates a picture of a scene 470 where a frame of a spot 480 appears at the center of the picture. FIG. 14 illustrates moving the frame of the spot 480 to the right when the user rotated his/her to the left. The dotted arrow 490 in the figure illustrates the change of the frame position relative to its original position. FIG. 15 illustrates moving the frame of the spot 490 to the bottom when the user rotated his/her head from up to down.

Figure 16:
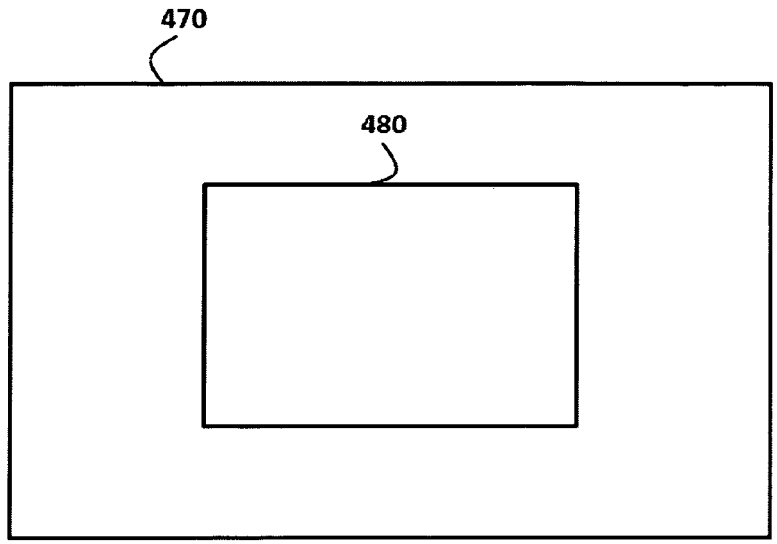
FIGS. 16 to 17 illustrate changing the size of the spot frame in the scene picture when the user moves away or closer from/to the computer display.
Figure 17:
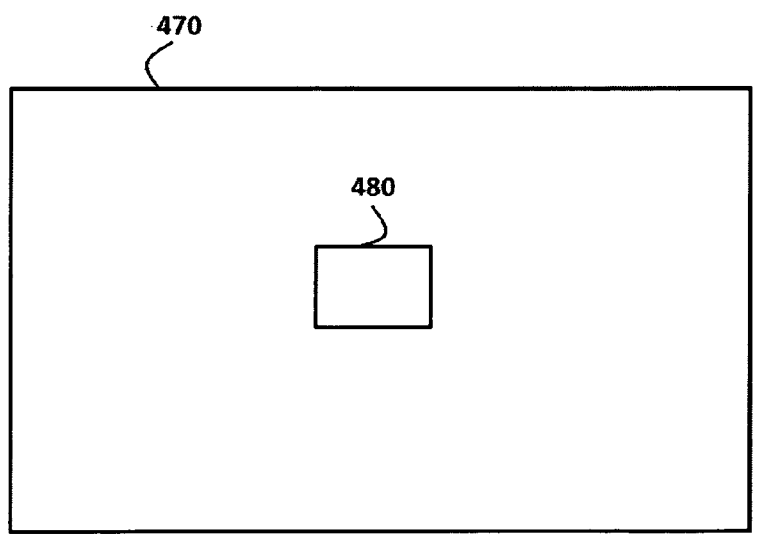

Detecting the movement of the user relative to the computer display can be achieved by analyzing the change of the size of the spot frame in the picture of the scene. For example, FIG. 16 illustrates increasing the size of the spot frame 480 inside the scene picture 470 when the user moves closer to the computer display. FIG. 17 illustrates decreasing the size of the spot frame 480 inside the scene picture 470 when the user moves closer to the computer display. Combining the detection of the rotation of the user's head with the movement of the user relative to the computer display enables the user to simply walk through the 3D virtual environment presented on the computer display. The detection of the user's rotation or movement is provided to the computer system as an input that is translated into a request for manipulating the virtual camera of the 3D virtual reality on the computer display.

In one embodiment of the present invention, the camera is automatically rotated against the rotation of the user's head to ensure locating the spot inside the picture of the scene. For example, if the user horizontally rotated his/her head to the right where the spot frame disappeared from the scene picture, in this case, the camera is automatically horizontally rotated to the left to make the spot frame appears in the scene picture. Also, if the user horizontally rotated his/her head to the left where the spot frame disappeared from the scene picture, in this case, the camera is automatically horizontally rotated to the right to make the spot frame appear in the scene picture.

If the user vertically rotated his/her head from up to down where the spot frame disappeared from the scene picture, then the camera is automatically vertically rotated from down to up to make the spot frame appear in the scene picture. Also, if the user vertically rotated his/her head from down to up where the spot frame disappeared from the scene picture, in this case, the camera is automatically vertically rotated form up to down to make the spot frame appear in the scene picture. In a similar manner, if a user moved far away from the computer display and the size of the spot frame became very small in the scene picture, then the camera zooms in to enlarge the size of the spot frame in the scene picture before dividing the image of the spot frame into zones.

In another embodiment, more than one camera is utilized with the device. For example, five cameras can be used with the device to place one camera on each of the front, top, bottom, left, and right sides of the device. For example, if the user rotated his/her body 180 degrees, the camera on the back side of the device captures the picture of the computer screen. Also, if the user is lying supine perpendicular to the computer screen, the camera on the top side of the device captures the picture of the computer screen. Generally, using such five cameras enables the user to change his/her position relative to the computer display while still interacting with the virtual reality on the computer display.

The main advantages of using the device of the present invention is converting the pictures, videos, movies, or virtual reality representations into immersion in real time. Accordingly, any picture, video, movie, virtual reality representation located in front of a user can be immediately converted into immersion. This is in contrast to the commercially available devices or methods for immersion where the visual data is previously prepared in a certain format which prevents the real time conversion of the visual data that the present invention performs. These advantages help spread the use of 3D immersion application for various educational, training, entertainment, and gaming purposes.

Conclusively, while a number of exemplary embodiments have been presented in the description of the present invention, it should be understood that a vast number of variations exist, and these exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below. Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

The invention claimed is:

1. A method for extracting an image of a spot located in a scene and presenting the image on a plurality of displays that entirely covers a user's sight wherein the image covers the entire areas of the plurality of displays and the method comprising;
    receiving a signal indicating a request for capturing the scene picture;
    extracting the image of the spot of the scene picture;
    dividing the image into a plurality of zones, wherein the number of zones is equal to the number of displays, the plurality of zones is defined by the projection of the boundary lines of at least one of a corresponding display of the plurality of displays onto the image relative to the user's point of view, and each of the plurality of zones of the image do not overlap each other;
    reforming each of the plurality of zones of the image to fit inside the boundar lines of each of the corresponding display of the plurality of displays; and
    displaying the each of the plurality of reformed zones on the corresponding displays of the plurality of displays.

2. The method of claim 1 wherein the spot is a picture located in a book, newspaper or magazines and a computer vision program is utilized to define the boundary lines of the spot.

3. The method of claim 1 wherein the spot is a picture or a movie presented on a computer display, television screen or theatre screen, and a computer vision program is utilized to define the boundary lines of the picture or the movie.

4. The method of claim 1 wherein the spot is a part of the scene and the selection of the spot frame is achieved by a rectangle presented and controlled by the user.

5. The method of claim 1 wherein the spot contains a virtual reality application presented on a screen, and the rotation or movement of the user manipulates the movement of the virtual camera on the computer display.

6. The method of claim 1 wherein the plurality of displays forms a shape of a 3D container with an opening that enables simultaneous viewing of the plurality of screens.

7. A device for extracting an image of a spot located in a scene and presenting the image on a plurality of displays that entirely covers a user's sight wherein the image covers the entire areas of the plurality of displays and the device is comprised of;
    a plurality of displays attached to each other to form a shape of a 3D container with an opening that enables simultaneous viewing of the plurality of displays;
    a camera that captures the picture of the scene with the spot;
    a button that can be pressed to generate a signal representing a request for converting the image into an immersive image;
    a microprocessor that
        extracts the image of the sport from the picture of the scene;

divides the image into a plurality of zones, wherein the number of zones is equal to the number of displays, the plurality of zones is defined by the projection of the boundary lines of at least one of a corresponding display of the plurality of displays onto the image relative to the user's point of view, and each of the plurality of zones of the image do not overlap each other;

reforms each of the plurality of zones of the image to fit inside the boundar lines of each of the corresponding display of the plurality of displays; and displays the each of the plurality of reformed zones on the corresponding displays of the plurality of displays.

8. The device of claim 7 wherein the spot is a picture located in a book, newspaper or magazines and a computer vision program is utilized to define the boundary lines of the spot.

9. The device of claim 7 wherein the spot is a picture or a movie presented on a computer display, television screen or theatre screen, and a computer vision program is utilized to define the boundary lines of the picture or the movie.

10. The method of claim 7 wherein the spot is a part of the scene and the selection of the spot frame is achieved by a rectangle presented and controlled by the user.

11. The method of claim 7 wherein the camera is automatically rotated against the rotation of the user's head to capture the spot in the scene picture.

12. The method of claim 7 wherein the camera is zooms in the spot when the size of the spot that appears in the scene picture becomes small.

13. The method of claim 7 wherein the camera is a plurality of cameras and each one of the plurality of cameras is positioned on one side of the device.

14. The method of claim 7 wherein a first device to be positioned on the left eye and the second device to be positioned on the right eye wherein the image of the spot is simultaneously presented on the first device and the second device.

15. The method of claim 7 wherein the spot contains a virtual reality application presented on a screen, and the rotation or movement of the user manipulates the movement of the virtual camera on the computer display.

16. The method of claim 11 wherein the detecting of the rotation of the user's head is achieved by analyzing the change of the location of the spot in the scene picture.

17. The method of claim 11 wherein the detecting of the movement of the user is achieved by analyzing the change of the size of the spot in the scene picture.

* * * * *